US00RE43194E

(19) United States
(12) Reissued Patent
Toimil

(10) Patent Number: US RE43,194 E
(45) Date of Reissued Patent: Feb. 21, 2012

(54) SPRING LOADED AND SELF-LOCKING CABLE GRIPPING APPARATUS

(75) Inventor: Andrew Toimil, Sonoma, CA (US)

(73) Assignee: Feeney, Inc., Oakland, CA (US)

(21) Appl. No.: 12/121,759

(22) Filed: May 15, 2008

Related U.S. Patent Documents

Reissue of:
(64) Patent No.: 7,043,801
Issued: May 16, 2006
Appl. No.: 10/956,830
Filed: Oct. 1, 2004

U.S. Applications:
(60) Provisional application No. 60/508,254, filed on Oct. 3, 2003.

(51) Int. Cl.
*F16G 11/00* (2006.01)

(52) U.S. Cl. ..... 24/136 R

(58) Field of Classification Search ..... 24/115 M, 24/136 R; 411/267; 403/314
See application file for complete search history.

(56) References Cited

U.S. PATENT DOCUMENTS

| | | | | | |
|---|---|---|---|---|---|
| 1,988,829 | A | * | 1/1935 | Bird | 24/136 R |
| 2,645,832 | A | * | 7/1953 | Lee | 24/136 R |
| 2,792,243 | A | | 5/1957 | Ridgers | |
| 3,220,743 | A | * | 11/1965 | Knapp | 24/136 R |
| 3,524,228 | A | * | 8/1970 | Kelly | 52/223.13 |
| 3,703,748 | A | | 11/1972 | Kelly | |
| 3,852,850 | A | * | 12/1974 | Filhaber | 24/136 R |
| 3,858,991 | A | | 1/1975 | Burtelson | |
| 3,937,607 | A | | 2/1976 | Rodormer | |
| 3,952,377 | A | * | 4/1976 | Morell | 24/136 R |
| 3,965,542 | A | * | 6/1976 | Gregory | 24/136 R |
| 3,965,543 | A | * | 6/1976 | Connors | 24/136 R |
| 5,015,023 | A | * | 5/1991 | Hall | 24/136 R |
| 5,233,730 | A | * | 8/1993 | Milne et al. | 24/136 R |
| 5,369,849 | A | * | 12/1994 | De France | 24/136 R |

FOREIGN PATENT DOCUMENTS

| | | | |
|---|---|---|---|
| CA | 1031550 | A | 5/1978 |
| DE | 9108810 | U1 | 9/1991 |

OTHER PUBLICATIONS

Certificate of Registration, issue date Nov. 14, 2008, for corresponding Mexican Patent No. MX 262200.

(Continued)

*Primary Examiner* — Robert J Sandy
(74) *Attorney, Agent, or Firm* — Intellectual Property Law Group LLP

(57) ABSTRACT

An embodiment of the present invention is a cable gripping apparatus comprised of a housing with a part conical shaped passageway, two serrated half-jaws, a spacer, a spring, a retaining clip and a cap. The apparatus is spring-loaded and self-locking for gripping and securing a cable. The serrated half-jaws and spring lock the cable in place and only allows the cable to move in one direction. The cap is placed at one end of the apparatus to prevent dirt and moisture from accumulating, thus minimizing the corrosion of the cable.

20 Claims, 6 Drawing Sheets

OTHER PUBLICATIONS

Patent Certificate of Chinese Invention Patent, issue date Jan. 28, 2009, for corresponding Chinese Application No. 200480028721.8.
European Search Report Under Article 153(7), mailing date Feb. 26, 2009, for corresponding European Application No. 04 794 082.0-1252.
Communication Pursuant to Article 94(3), mailing date Jun. 8, 2009, for corresponding European Application No. 04 794 082.0-1252.
Chinese State Intellectual Property Office, Chinese Office Action, dated Dec. 11, 2009, for corresponding divisional Patent Application No. 200810184109.X.
Chinese State Intellectual Property Office, Chinese Office Action, dated Jun. 2, 2010, for corresponding divisional Patent Application No. 200810184109.X.
European Notification of Grant, dated Sep. 27, 2010, for corresponding European Application No. 04 794 082.0-1252.

* cited by examiner

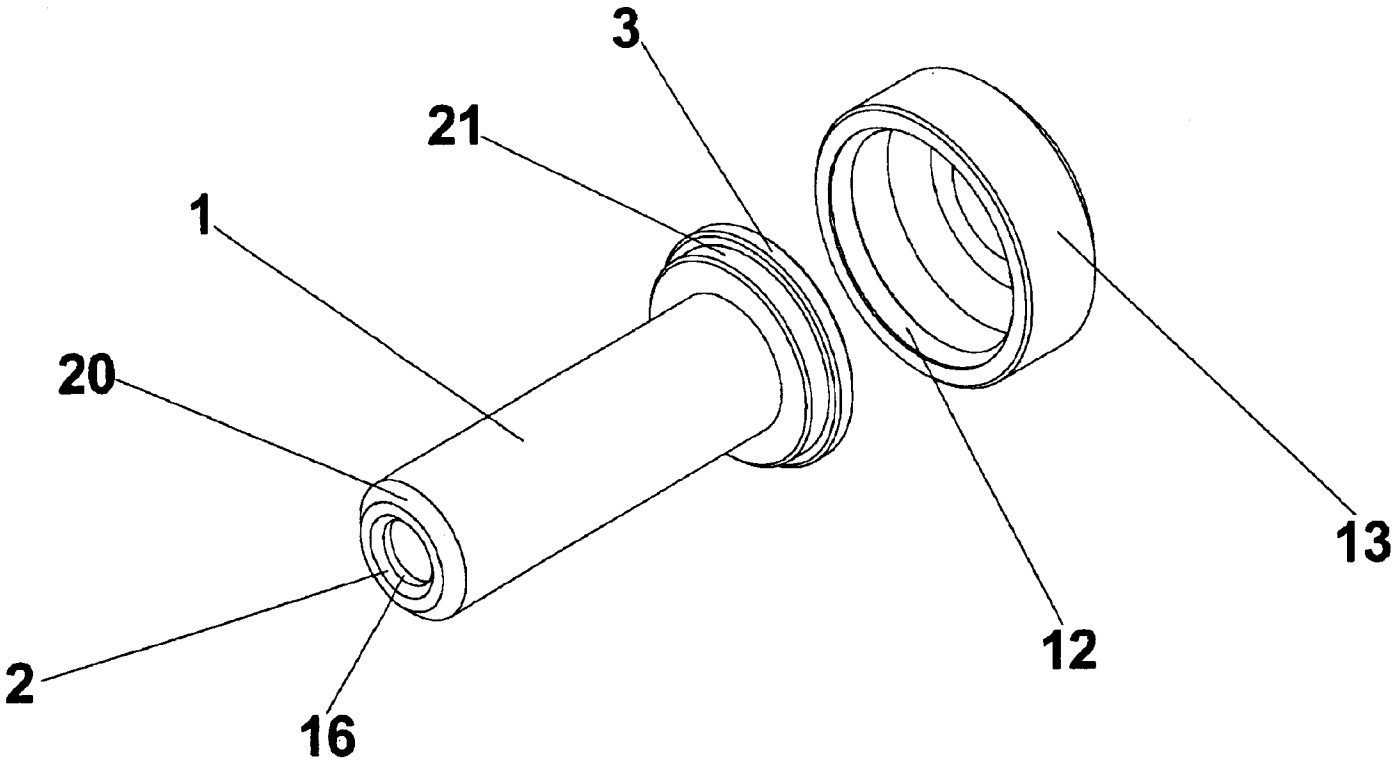
Fig. 1.1

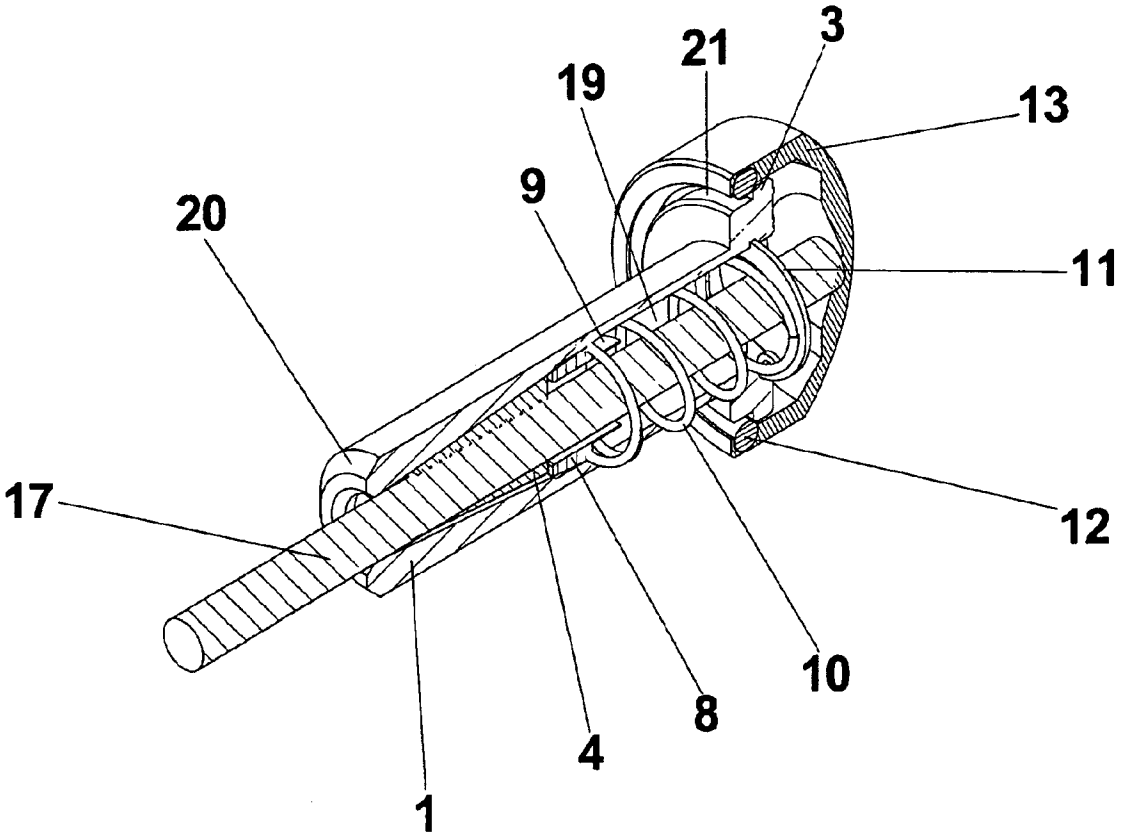
Fig. 1.2

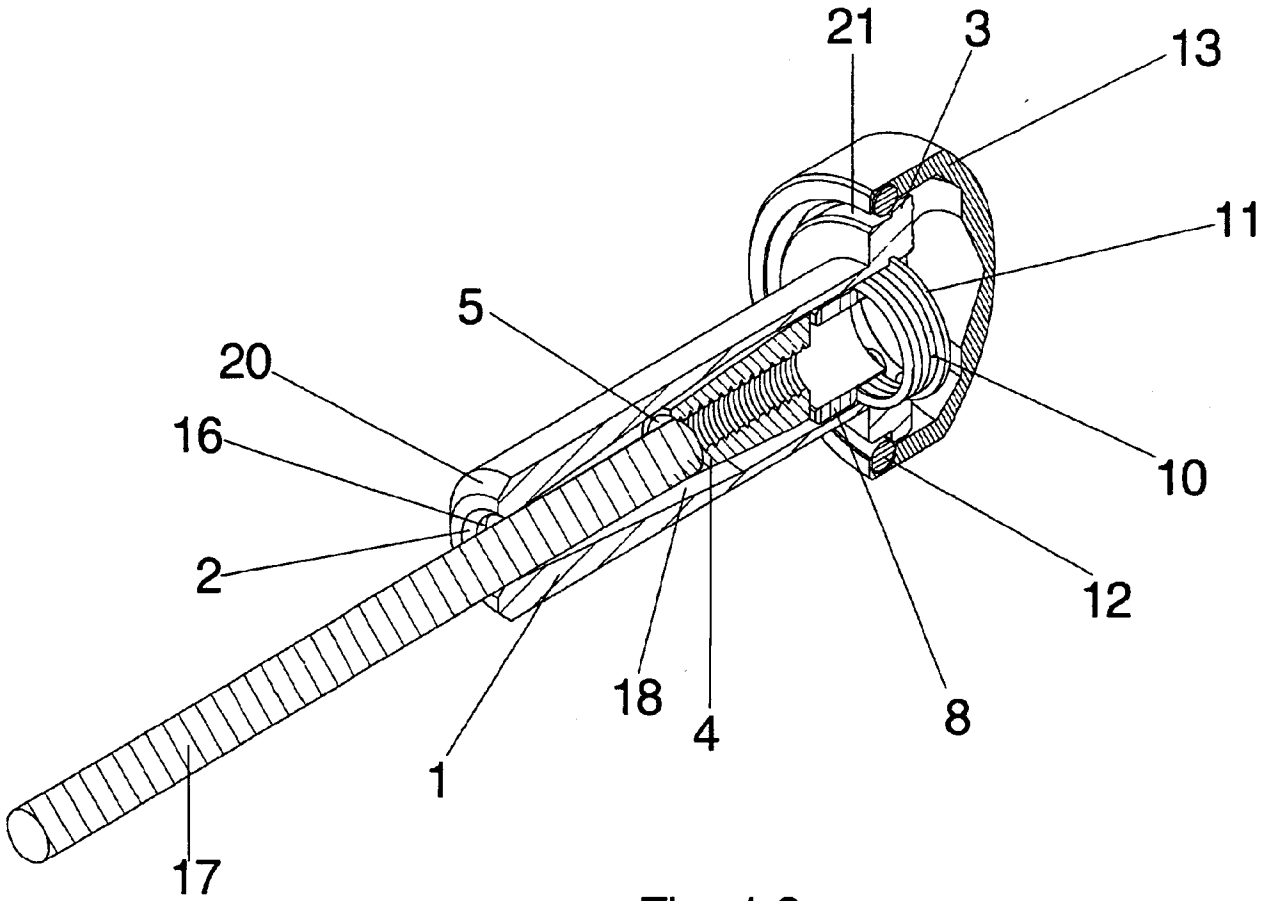
Fig. 1.3

SPRING LOADED AND SELF-LOCKING CABLE GRIPPING APPARATUS

Matter enclosed in heavy brackets [ ] appears in the original patent but forms no part of this reissue specification; matter printed in italics indicates the additions made by reissue.

CROSS REFERENCE

This application claims the benefit of priority from U.S. Provisional Application No. 60/508,254 entitled "Spring Loaded and Self-Locking Cable Gripping Apparatus", filed Oct. 3, 2003, which is herein incorporated by reference.

FIELD OF INVENTION

The present invention generally relates to an improved cable gripping apparatus which allows a user to secure a variety of cable materials, make adjustments to the length and tension of the cable materials, and shield the cable materials in a stainless steel casing to minimize corrosion of said cable materials.

BACKGROUND OF THE INVENTION

There exists in the field of securing cables, devices for gripping and anchoring a variety of cables to enclosures or structures. The conventional procedure for cable gripping devices involves a casing with a hollow conical-shaped wedge, wherein the wedge contains a threaded inner surface. Some devices additionally provide a spring held within the one end of the conical-shaped wedge. Together the spring and the threaded surface guide a cable through the device and grip the cable materials.

Various such cable gripping devices are currently available. However, such devices often have too many components. The multiplicity of components create confusion for the user. Further, such components are prone to be lost, misplaced or damaged, rendering the device useless. Such devices are also larger than necessary, requiring additional material to manufacture. Also, components of such devices are shaped in complicated designs for instance T-shaped cutouts, requiring added expense when manufacturing the components as well as increasing the possibility that components will not fit well. Additionally, with prior devices, dirt and moisture are prone to becoming trapped within such devices. This often leads to corrosion of the cables held within the devices. Furthermore, there are no devices to accommodate smaller sized cables with diameters such as small as 1/16 inch to 1/8 inch.

Therefore, there exists a need to provide a spring loaded and self-locking cable gripping apparatus that (1) is capable of securing a variety of cable materials, and particularly aircraft cable; (2) is simple to use for making length and tension adjustments; (3) is capable of being hidden in an enclosure with only a low profile cap being visible while minimizing the corrosion of the apparatus from the elements such as salt air and the like; (4) possesses sufficient strength because of the materials that make up the apparatus parts.

Further objects of the invention will become apparent from the following description.

SUMMARY OF THE INVENTION

The embodiments of the present invention solve the problems and address the drawbacks of the approaches in the above description. It is an object of the present invention to provide a spring loaded and self-locking cable gripping apparatus of a minimum of components, sturdy, non-corrosive, and capable of securing a variety of cable materials of even very small diameter. It is an object of the present invention to provide a finished look to a cable apparatus in use and at the same time protect the. components of the apparatus from damage.

An embodiment of the present invention is a spring loaded and self-locking gripping apparatus comprising a housing with a central conical passageway section, a pair of serrated half-jaws, a spacer, retaining clip, an o-ring, a spring, and a cap at one end of the housing. The housing has a receiving end and a dispatching end. The spring is housed within the conical passageway at the receiving end. The two serrated half-jaws fit tightly into the conical passageway at the dispatching end. The cap is attached to the exterior of the dispatching end. The spacer separates the serrated jaws from the spring. The retaining clip and the o-ring separates the spring from the cap. The serrated half-jaws also have a conical shape. Each serrated half-jaw have an inner surface and an outer surface. The inner surface is serrated. The two serrated half-jaws are tapered to the receiving end.

In an embodiment of the present invention, cable material enters the apparatus from the receiving end of the housing. The pressure from the cable material causes the serrated jaws to open, thus allowing the cable to enter the apparatus. The pressure from the cable also causes the spring to be compressed which applies pressure against the spacer which in turn presses against the jaws against the cable. The jaws slide longitudinally toward the dispatching end and begin to separate. As the serrated jaws open, the cable is received through the passageway until the spring is expanded. The applied pressure of the spring to the spacer and the spacer to the jaws keeps the receiving end of the jaws in place by causing the jaws to close, thus securely gripping the cable. Thus, the cable is locked within the apparatus and can only move from the receiving end to the dispatching end.

In the preferred embodiment, the apparatus comprises an end cap at the dispatching end of the housing including an o-ring for sealing the dispatching end of the housing from the environment and providing a clean finish. When in use, the gripping apparatus is enclosed in a structure and only the end cap remains visible on the structure.

In additional alternative embodiments, the components of the present invention are made of stainless steel. In the preferred embodiment, the o-ring is not made of stainless steel but is preferably composed of an elastomeric material such as a rubber, silicone or other similar flexible material.

In additional alternative embodiments, the serrated half-jaws and the spacer have diameters ranging from 1/16 inch to 1/8 inch.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 1.1 is an exploded perspective view of the cable gripping apparatus, according to an embodiment of the present invention.

FIG. 1.2 is a cross-sectional view of the cable gripping apparatus in a closed state with a cable inserted, according to an embodiment of the present invention.

FIG. 1.3 is a cross-sectional view of the cable gripping apparatus with a cable partially inserted, the spring in its compressed state, according to an embodiment of the present invention.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

Figure 1:
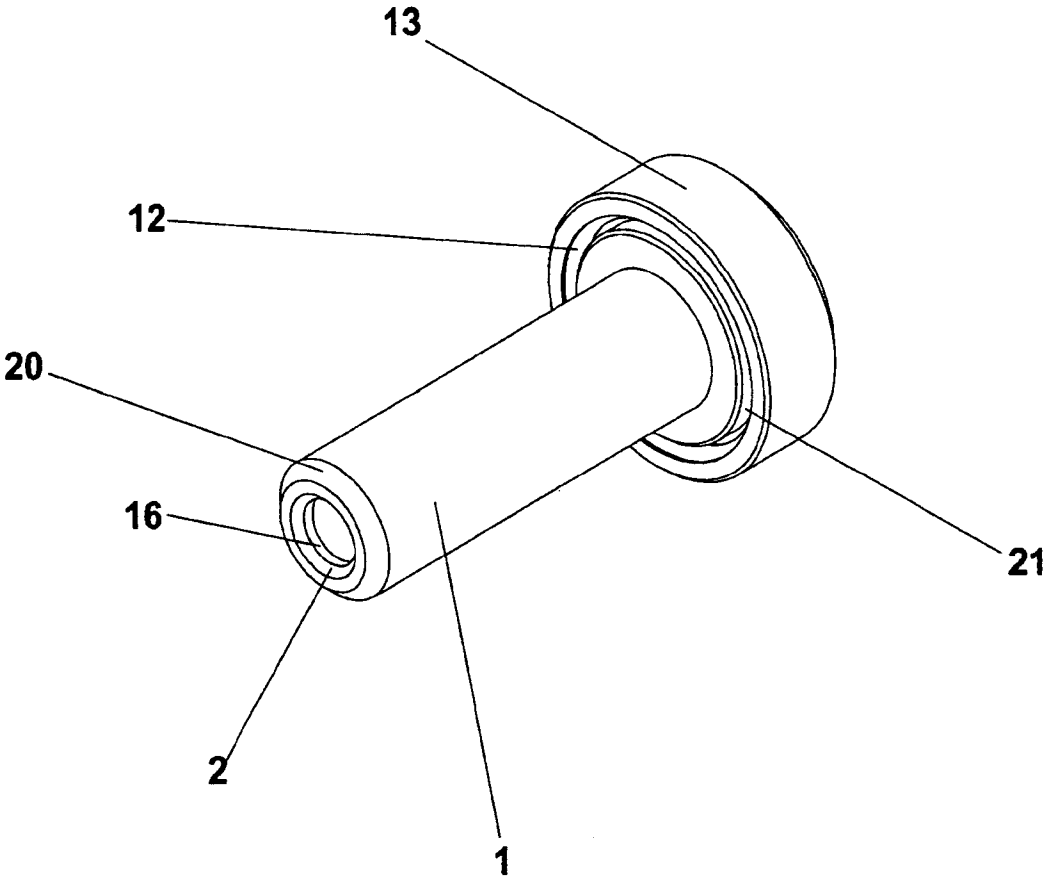
FIG. 1 is a perspective view of the cable gripping apparatus in its fully assembled state, according to an embodiment of the present invention.

FIG. 1 shows a perspective view of an embodiment of the spring loaded and self-locking cable gripping apparatus in its fully assembled state. The apparatus comprises a cylindrical main housing 1 having a central passageway beginning from the bore 16 and a cap 13. In the preferred embodiment, the main housing 1 further comprises an inside bevel 2 located on a first end side, an outside bevel 20, a large diameter outside flange 21 located on a second end side of the main housing 1 and forming an integral part of the main housing 1. Furthermore, an o-ring 12 rests between the cap 13 and outside flange 21. The material of all elements is preferably is preferably of stainless steel except for the o-ring 12. The o-ring is preferably of an elastomeric material such as a rubber, silicone or other similar flexible material.

As shown in FIG. 1.1, an exploded view of FIG. 1 illustrates the cap 13 and o-ring 12 apart from the main housing 1 before assembly. The main housing 1 is shown with a lip 3 adjacent to and having a larger diameter than the outside flange 21. The lip 3 is also formed as an integral part of the main housing 1. When the main housing 1 is assembled with the cap 13, the o-ring 12 which rests in an inside circular recess of the cap 13, snaps over the lip 3 of the main housing, and therein provides a seal against environmental elements of dust, dirt, moisture or other contaminants from entering the housing passageway.

Figure 2:
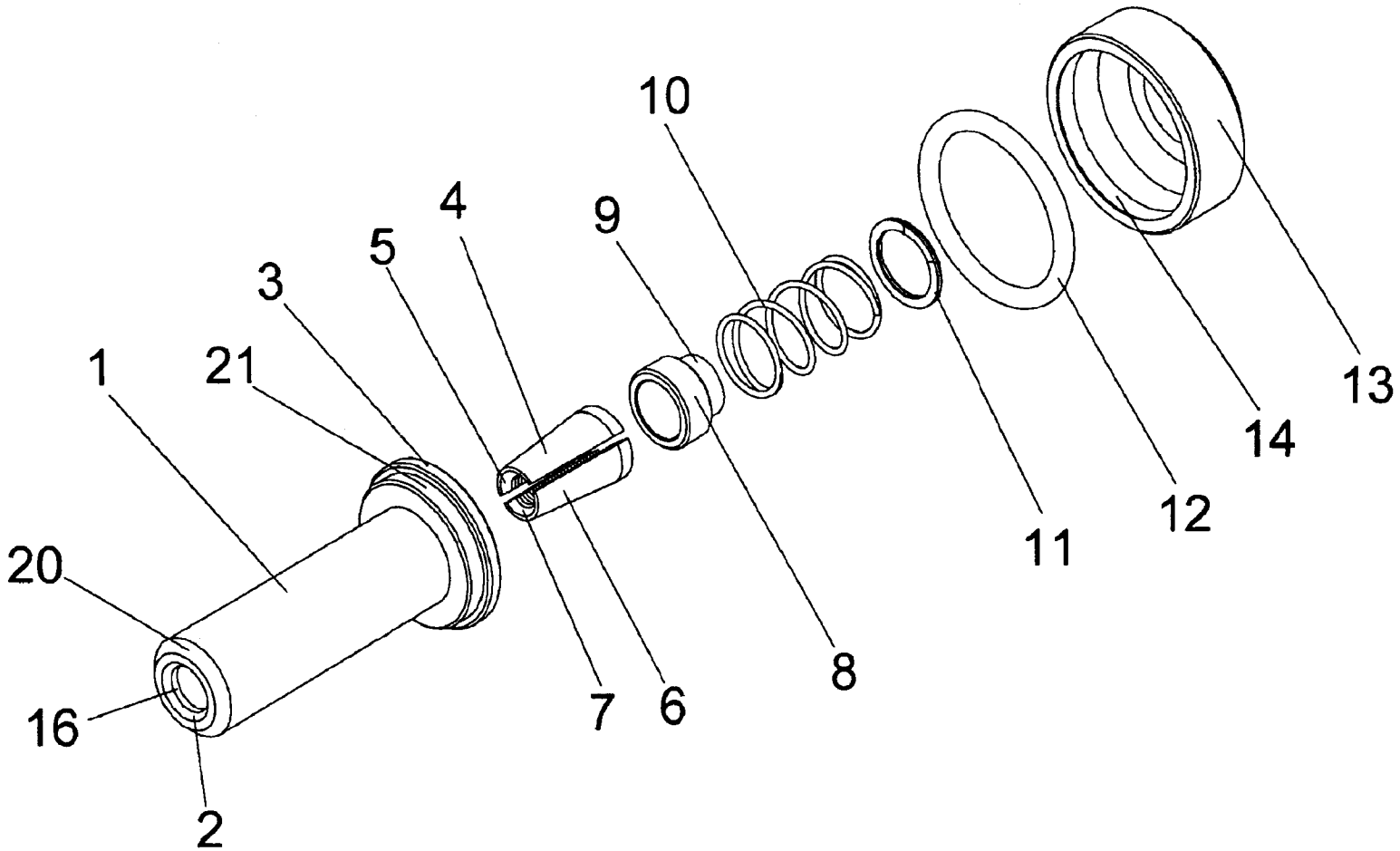
FIG. 2 is an exploded view of FIG. 1.

Referring now to FIG. 2, an exploded perspective view of a preferred embodiment of the present invention shows the various components contained within the housing 1. The housing 1 comprises a pair of half jaws shown as half-jaw 4, half-jaw 6, spacer 8, spring 10, retaining clip 11, o-ring 12 and cap 13. Preferably, the pair of half jaws 4, 6 have a serrated or threaded inner surface defining a circular channel. Half-jaw 4 and half-jaw 6 when positioned together in the main housing 1, form a conical shape wherein the smaller diameter side half-jaw 4 includes a drawing bevel end 5 and drawing bevel end 7 for half-jaw 6. The bevel ends 5, 7 allow for ease in guiding a cable receiving through the first end side of the main housing 1, through bore 16. Spacer 8, comprises a circular flange section at a first spacer end a smaller diameter second end having a uniformly circular outer surface 9 formed as an integral part of the spacer 8. Spring 10 has a diameter no larger than the outer diameter of the circular flange section of spacer 8, such that spring 10 rests against the flange section of spacer 8 and around outer surface 9. Such assembly provides for added stability within the housing. Cap 13 further comprises an inside annular recess 14 where o-ring 12 rests inside.

Figure 3:
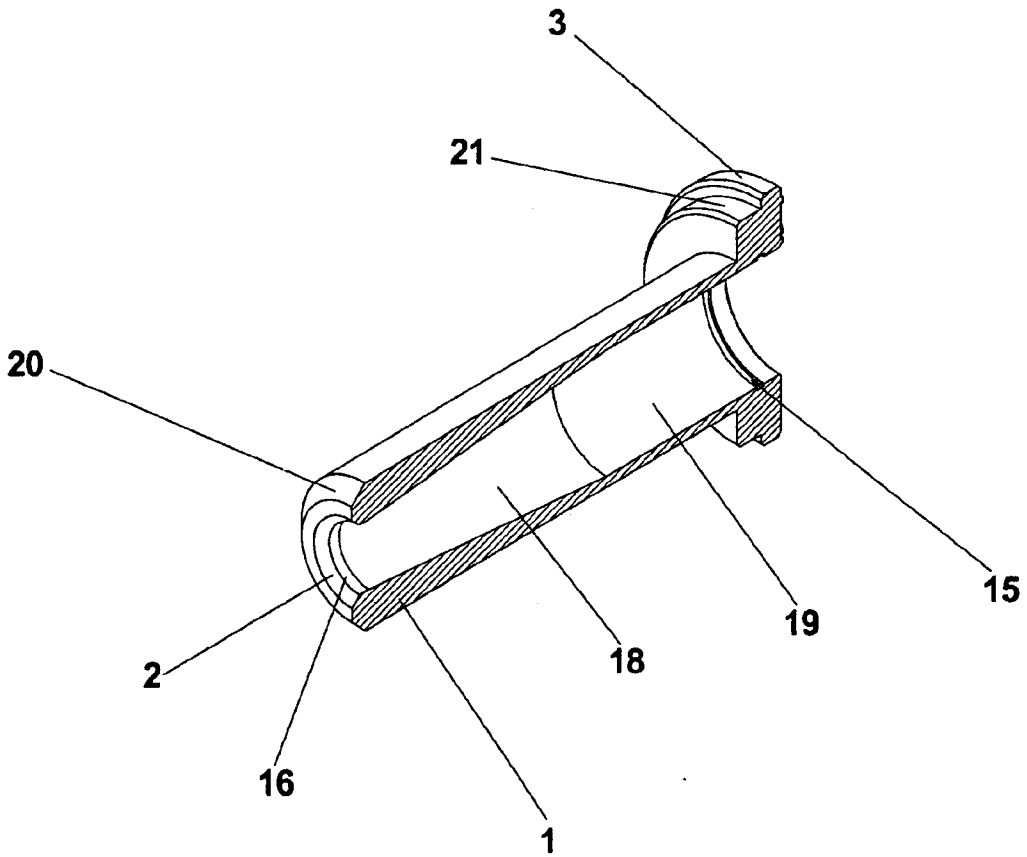
FIG. 3 is a cross-sectional view of the main housing of the cable gripping apparatus, according to an embodiment of the present invention.

FIG. 3 shows a perspective cross-sectional view of the main housing 1 of an embodiment of the present invention with small bore 16, tapered bore section 18, a large straight bore section 19 with annular groove 15, outside flange 21 with a larger outside diameter lip 3, an outside bevel 20 on a cable receiving first end of the housing 1, and a inside bevel 2 on a cable receiving first end of the housing 1.

FIG. 1.3 shows a cross-sectional view of an embodiment of the present invention with a cable 17 partially inserted into the apparatus through bore 16 at the first end side of the housing 1. As cable 17 is inserted, it is guided to the center passageway by inside bevel 2 of the main housing 1, drawing bevel 5 and drawing bevel 7. Applying pressure to the cable 17 causes serrated half-jaw 4 and serrated half-jaw 6 to travel in a longitudinal direction from tapered bore section 18 toward the larger straight bore section 19, creating an opening in between half-jaw 4 and half-jaw 6, allowing cable 17 to be inserted and received through the half-jaws 4, 6. As illustrated in FIG. 1.3, the opening between the half-jaws 4, 6 is created when spring 10 in its compressed state applies pressure to spacer 8, serrated half-jaw 4, and serrated half-jaw 6 against the direction of the cable 17. As cable 17 enters the apparatus, pressure is applied in both directions on half-jaws 4, 6 and as the jaws 4, 6 slide toward larger straight bore section 19, jaws 4, 6 also move radially to accommodate the size of cable 17, in turn jaws 4, 6 grip and lock upon cable 17, preventing movement of cable 17 out of the apparatus. Spring 10 is steadied by spacer 8 and containment of parts is facilitated by retaining clip 11.

As shown in FIG. 1.2 a cross-sectional perspective view of an embodiment of the present invention illustrates cable 17 completely inserted and gripped in the apparatus. Spring 10 is in its expanded state applying pressure to the spacer 8, which is kept in line by the smaller diameter outer surface 9 of spacer 8, which acts as a guide for spring 10. Spacer 8 applies pressure to the jaw 4 and jaw 6 , causing jaw 4 and jaw 6 to close upon cable 17. FIG. 1.2 illustrates the apparatus in its closed state, the pressure of spring 10 and the tapered section 18, allows cable 17 to move in one direction inward and not in the other direction therefore causing the apparatus to self-lock upon cable 17.

Retaining clip 11, as shown in FIG. 1.2, is inserted into the retaining clip annular groove 15 shown in FIG. 3, assuring the containment of the various components contained within the housing 1 while the diameter of bore 16 prevents passage of the various components in the opposite direction. Bore 16 has a smaller diameter than the smallest diameter of the conical shape of jaws 4, 6, therein preventing bypass of any component out from the apparatus.

As further illustrated in FIG. 1.2, o-ring 12 is provided over and beyond larger lip 3 when cap 13 is in place. Since the inner diameter of o-ring 12 is smaller than the diameter of lip 3, o-ring 12 deforms and causes the cap 13 to snap into place and forms a protective seal upon housing 1. The flat surface of the larger diameter outside flange 21 assumes the role of a washer and holds the apparatus in place when the apparatus is inserted in an enclosure or structure. Once inserted in an enclosure or structure such as a post, the apparatus is hidden from view except for cap 3 which finishes and seals off lip 3 of the apparatus.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A cable gripping apparatus comprising a cylindrical main housing having a central passage, an open first end and an open second end;

an outside [circular] flange abutting the second end and formed as an integral structure of the main housing;

[an outside lip at the second end abutting the flange and formed as an integral structure of the main housing;]

a pair of half jaws, housed within said main housing;

a spacer [having a first spacer end and a second spacer end, the first spacer end having a diameter larger than a diameter of the second spacer end, the spacer] positioned within the main housing against the pair of half jaws;

a spring [having a diameter no larger than the first spacer end,] positioned in the main housing [next to] *abutting* the [second] spacer [end];

a retaining [clip having a diameter larger than the diameter of the spring and] *mechanism* positioned in the main housing next to the spring;

wherein a cable enters the apparatus at the first end of the main housing and is advanced through the housing, through the jaws, and as the spring is compressed, force is exerted upon the spacer and the jaws, thereby self-locking the cable.

2. The cable gripping apparatus according to claim 1, wherein the central passage comprises:

a larger bore side and a smaller bore side; the larger bore side having a section of a constant bore diameter beginning from the second end of the main housing, then tapering gradually to the smaller bore side[; and an internal groove inside the passage at the second end of the main housing for engaging the retaining clip].

3. The cable gripping apparatus according to claim 2, wherein the pair of halfjaws are concentrically situated within the central passage having a conical tapered circumference, the jaws are slidable along an axial length of the housing and radially movable, wherein as a cable is inserted into the first end of the housing, the jaws slide along the axial length toward the larger bore side of the central passage, exerting pressure on the spring until the jaws separate for receiving a cable.

4. The cable gripping apparatus according to claim 3, wherein the pair of jaws have a serrated inside surface which contacts the cable when inserted into the apparatus.

5. The cable gripping apparatus according to claim [2] *1*, wherein the housing has an outer surface with a constant circumference along an axial length of the housing from the first end to the second end, and wherein the first end has an inside diameter smaller than an inside diameter of the second end.

6. The cable gripping apparatus according to claim [2] *1*, wherein the main housing further comprises an outside bevel and an inside bevel on the first end, the inside bevel having a smaller diameter than a diameter of the outside bevel.

7. The cable gripping apparatus according to claim [2] *1*, further comprising a [compressible o-ring having a smaller inside diameter than a diameter of the outside lip, and a] cap [engaged upon the o-ring,] encasing the second end and providing a seal against the outside [lip] *flange*.

8. The cable gripping apparatus according to claim [2] *1*, wherein the spacer comprises a uniformly circular flange section at [the] *a* first spacer end and [the] *a* second spacer end has a uniformly circular outer surface, the diameter of the circular outer surface being smaller than the diameter of the spring, allowing the spring to rest around the outer surface of the second spacer end and against the flange section.

9. The cable gripping apparatus according to claim 5, wherein the main housing further comprises an inside bevel on the first end, the inside bevel having a larger diameter than the inside diameter of the first end.

10. The cable gripping apparatus according to claim [2] *1*, wherein the entire apparatus is comprised of stainless steel.

11. A spring loaded and self-locking cable gripping apparatus comprising a cylindrical main housing having a central passage, an open first end and an open second end, [the housing having an outer surface with a constant circumference along an axial length from the first end to the second end,] *with* the first end having an inside diameter smaller than an inside diameter of the second end, the central passage defining a larger bore side and a smaller bore side, the larger bore side having a section of a constant bore diameter beginning from the second end, then tapering gradually to the smaller bore side[, and an internal groove inside the passage at the second end];

an outside [circular] flange at the second end of the main housing;

[an outside lip at the second end of the main housing next to the flange;]

a pair of tapered halfjaws, having a serrated inside surface, housed within said main housing;

a spacer [having a first spacer end and a second spacer end, the first spacer end having a diameter larger than a diameter of the second spacer end, the spacer] positioned within the main housing against the pair of serrated jaws;

a spring [having a diameter no larger than the first spacer end,] positioned in the main housing against the [second] spacer [end];

a [retaining clip having a diameter larger than the diameter of the spring and]*retainer* positioned in the main housing next to the spring [and engaged in the internal groove];

wherein a cable enters the apparatus at the first end of the main housing and is advanced through the housing, through the jaws, and as the spring is compressed, force is exerted upon the spacer and the jaws, thereby self-locking the cable.

12. The cable gripping apparatus according to claim 11, wherein the pair of halfjaws are concentrically situated within the central passage having a conical tapered circumference, the jaws are slidable along an axial length of the housing and radially movable, wherein as a cable is inserted into the first end of the housing, the jaws slide along the axial length toward the larger bore side, exerting pressure on the spring until the jaws separate for receiving the cable.

13. The cable gripping apparatus according to claim [12] *11*, wherein the main housing further comprises an outside bevel and an inside bevel on the first end, the inside bevel having a smaller diameter than a diameter of the outside bevel.

14. The cable gripping apparatus according to claim [12] *11*, further comprising [a compressible o-ring having a smaller inner diameter than a diameter of the outside lip, and] a cap [engaged upon the o-ring,] encasing the second end and providing a seal against the outside [lip] *flange*.

15. The cable gripping apparatus according to claim [12] *11*, wherein the spacer comprises a uniformly circular flange section at [the] *a* first spacer end and [the] *a* second spacer end has a uniformly circular outer surface, the diameter of the outer surface being smaller than the diameter of the spring, allowing the spring to rest around the outer surface of the second spacer end and against the flange section.

16. The cable gripping apparatus according to claim [12] *11*, wherein the entire apparatus is comprised of stainless steel.

17. A cable gripping apparatus comprising a cylindrical main housing having a central passage, an open first end, an open second end, an outside [circular] flange abutting the second end and formed as an integral structure of the main housing, an outside lip at the second end abutting the flange [and formed as an integral structure of the main housing];

two half jaws, housed within said main housing, a spacer [having a first spacer end and a second spacer end] *positioned within the main housing*, a spring means positioned in the main housing next to the [second] spacer [end];

a retaining [clip] *mechanism* positioned in the main housing next to the spring;

[an o-ring having a smaller inner diameter than a diameter of the outside lip,] and a cap engaged upon the [o-ring] *outside lip*, encasing the second end and providing a seal against the outside lip;

wherein a cable enters the apparatus at the first end of the main housing and is advanced through the housing, through the jaws, and as the spring is compressed, force is exerted upon the spacer and the jaws, thereby self-locking the cable and the cap prevents dirt and moisture from entering the central passage.

18. The cable gripping apparatus according to claim 17, wherein the apparatus is engaged with a cable and enclosed within a structure such that only the cap is visible against the structure.

19. The cable gripping apparatus according to claim 17, wherein the two half jaws further define a threaded internal circular channel for receiving the cable and each of the two halfjaws has a beveled end at a side facing the first end of the main housing.

20. The cable gripping apparatus according to claim 17, wherein the spacer comprises a uniformly circular flange section at [the] *a* first spacer end and [the] *a* second spacer end has a uniformly circular outer surface, the diameter of the circular outer surface being smaller than the diameter of the spring, allowing the spring to rest around the outer surface of the second spacer end and against the flange section.

* * * * *

US00RE43194C1

(12) INTER PARTES REEXAMINATION CERTIFICATE (721st)

United States Patent

Toimil

(10) Number: US RE43,194 C1

(45) Certificate Issued: Oct. 30, 2013

(54) SPRING LOADED AND SELF-LOCKING CABLE GRIPPING APPARATUS

(75) Inventor: Andrew Toimil, Sonoma, CA (US)

(73) Assignee: Feeney, Inc., Oakland, CA (US)

Reexamination Request:
No. 95/002,061, Jul. 31, 2012

Reexamination Certificate for:

| | |
|---|---|
| Patent No.: | **Re. 43,194** |
| Issued: | **Feb. 21, 2012** |
| Appl. No.: | **12/121,759** |
| Filed: | **May 15, 2008** |

Related U.S. Patent Documents

Reissue of:

| | |
|---|---|
| (64) Patent No.: | **7,043,801** |
| Issued: | **May 16, 2006** |
| Appl. No.: | **10/956,830** |
| Filed: | **Oct. 1, 2004** |

Related U.S. Application Data

(60) Provisional application No. 60/508,254, filed on Oct. 3, 2003.

(51) Int. Cl.
*F16G 11/00* (2006.01)

(52) U.S. Cl.
USPC ..... 24/136 R

(58) Field of Classification Search
USPC ..... 24/136 R, 115 M; 411/267; 403/314
See application file for complete search history.

(56) References Cited

To view the complete listing of prior art documents cited during the proceeding for Reexamination Control Number 95/002,061, please refer to the USPTO's public Patent Application Information Retrieval (PAIR) system under the Display References tab.

*Primary Examiner* — Matthew C. Graham

(57) ABSTRACT

An embodiment of the present invention is a cable gripping apparatus comprised of a housing with a part conical shaped passageway, two serrated half-jaws, a spacer, a spring, a retaining clip and a cap. The apparatus is spring-loaded and self-locking for gripping and securing a cable. The serrated half-jaws and spring lock the cable in place and only allows the cable to move in one direction. The cap is placed at one end of the apparatus to prevent dirt and moisture from accumulating, thus minimizing the corrosion of the cable.

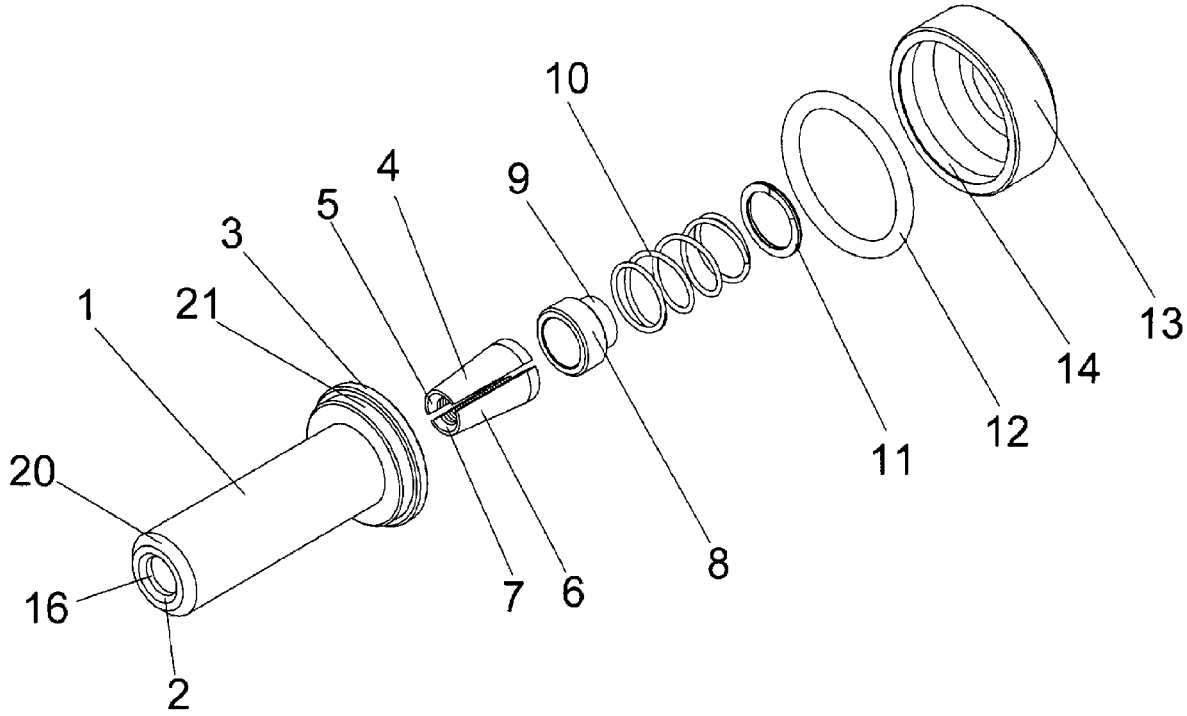

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *